3,832,342
INHIBITED STARCH PRODUCTS CONTAINING
LABILE AND NON-LABILE CROSS-LINKS
Morton W. Rutenberg, North Plainfield, Martin M. Tessler, Edison, and Leo Kruger, Kendall Park, N.J., assignors to National Starch and Chemical Corporation, New York, N.Y.
No Drawing. Filed Sept. 11, 1972, Ser. No. 287,887
Int. Cl. C08b 19/04
U.S. Cl. 260—233.5       9 Claims

ABSTRACT OF THE DISCLOSURE

Granular starch is inhibited with two different cross-linking agents, one producing a labile cross-linkage and the other a non-labile cross-linkage. The thus produced starch derivatives display utility in food products.

BACKGROUND OF THE INVENTION

This invention relates to a method for the preparation of novel starch derivatives which are inhibited by labile as well as non-labile cross-linkages, and to the novel derivatives thereby prepared.

The term "inhibited starch" refers to a starch in which the starch granules have been toughened so that they are more resistant to rupturing during cooking than ordinary starch granules. Inhibited starches may exhibit a markedly reduced tendency to swell or gelatinize and generally display a comparatively short, non-cohesive consistency after cooking. The degree of inhibition can be controlled and varied over a wide range so as to produce starches in which the tendency of the swollen granules to rupture is decreased through successive stages to starch products in which the swelling of the granules is so highly restrained that they will not swell noticeably when cooked in boiling water.

It is well known that starch may be inhibited, while in granular form, by reaction with polyfunctional reagents, such as epichlorohydrin, phosphorus oxychloride, divinyl sulfone, sodium trimetaphosphate etc., which cross-link the starch molecules within the granule. Such inhibition is disclosed in Felton et al., U.S. Pat. 2,328,537, Konigsberg, U.S. Pat. 2,500,950, Schoene, U.S. Pat. 2,524,400, and Kerr et al., U.S. Pat. 2,884,413. This reaction results in the formation of covalent chemical linkages which reinforce the normal hydrogen bonds between starch molecules which hold the granule together. As a result, when the treated starch is cooked under conditions which normally weaken or destroy the hydrogen bonds the granules are swollen but remain intact because of these covalent linkages.

Inhibited granular starches are desired for various industrial uses. They are particularly useful in applications where the cohesiveness or stringiness of native starches is found to be objectionable, for example, in the food industry where starch products yielding short, smooth pastes on cooking are used as thickening agents in pies, sauces and soups, etc.

It is often advantageous that the cross-linkages which are introduced into inhibited starch products should be labile, i.e. they should be such as to permit their being readily and controllably disrupted or removed. Among methods for disrupting or removing these labile cross-linkages are treatments of the inhibited starches with heat (retorting), acids, or bases, or combinations of these.

SUMMARY OF THE INVENTION

It is the principal object of this invention to provide a method for the preparation of novel inhibited starch products containing both labile cross-linkages as well as non-labile cross-linkages. The combination of both types of inhibition permits dispersions of these starches to exhibit a high degree of inhibition initially, while the labile cross-linkages provide these products with latent swelling characteristics. The non-labile cross-linkages remaining after the labile cross-linkages have been disrupted or removed will retard the complete or undesirable degree of swelling of the granules and give the starch dispersions a desired short and smooth texture.

Various other objects and advantages of this invention will become apparent from the following description.

We have now found that we can prepare inhibited starch products containing two different types of cross-linkages. These novel starch products are very useful in preparing food products having a thin consistency before retorting and a desirably thick consistency after retorting.

According to this invention, a starch base is usually first reacted with a reagent which will produce relatively non-labile cross-linkages, as for example, epichlorohydrin, phosphorus oxychloride, 1,4-dichlorobutene-2, cyanuric chloride, sodium trimetaphosphate, followed by reaction with a reagent which will produce a labile cross-linkage, such as an ester-cross-linkage, as, for example, bis(ethylcarbonic)adipic anhydride, linear polymeric adipic anhydride, bis(ethylcarbonic)fumaric anhydride, succinyl guanidine, adipyl guanidine, phosgene, 1,1'carbonyldimidazole, diimidazolide of succinic acid, diimidazolide of adipic acid, divinyl adipate, mixtures of adipic acid with acetic anhydride, etc. Labile cross-linkages can also be introduced by reacting starch with chlorine and glycine, as disclosed by Evans et al., in U.S. 3,463,668. The resulting dually inhibited starch products are characterized by their ability to be subsequently controllably and readily converted into more highly swollen products, similar to the base starch after treatment with the non-labile cross-linking reagent, but before treatment with the labile cross-linking reagent.

DESCRIPTION OF THE PREFERRED EMBODIMENTS

The starch base materials which may be used in preparing our inhibited starch products may be derived from any plant source including corn, potato, sweet potato, wheat, rice, sago, tapioca, waxy maize, sorghum, high amylose corn, or the like. Also included are the conversion products derived from any of these bases including, for example, dextrins prepared by the hydrolytic action of acid and/or heat; oxidized starches prepared by treatment with oxidants such as sodium hypochlorite; derivatized starches such as starch esters and ethers; and fluidity or thin boiling starches prepared by mild acid hydrolysis. Our use of the term "starch base" is thus seen to include any amylaceous substances, whether untreated or chemically modified, which still retain free hydroxyl groups capable of entering into the cross-linking reaction of this invention and are in granular form. If it is desirable to use a starch which has substituents which are labile under the conditions used to inhibit the starch, these substituents can be added after the inhibition reaction.

Our novel inhibited products may exhibit various degrees of inhibition, depending upon the total amount of labile and non-labile cross-linkages introduced. Ordinarily, the starch bases are inhibited with the non-labile cross-linkage-producing reagent so as to yield products which upon cooking at buffered pH 6.1 (4–8% solids) in a boiling water bath for a period of 20 minutes give pastes having a Brookfield Viscosity of 6,000–25,000 cps, measured at 72° F. After retorting at 250° F. at pH 6.1 for a period of 15 minutes, the Brookfield Viscosity increases to 7,000–40,000 cps. The dually inhibited starch products, after cooking at buffered pH 6.1 (4–8% solids) in a boiling water bath for a period of 20 minutes give pastes having a Brookfield Viscosity of about 40–5,000 cps, measured at 72° F. After retorting the viscosity increases to 500-40,000 cps. The pH 6.1 buffer is prepared by dissolving 11.6 parts maleic acid in 1,000 parts distilled water and adjusting pH to 6.1 with 50% aqueous sodium hydroxide solution. The precise viscosity of the dispersion will depend upon the base starch employed, the per cent solids, and the level of labile and non-labile cross-linkages present in the starch. One skilled in the art will recognize that the desired dispersion viscosity can be obtained by adjusting the per cent starch in the dispersion. Normally, 4–8% starch, dry basis, will give dispersions having the above viscosity ranges.

The above viscosity ranges are indicative of the viscosities of the dually inhibited starch products. The products of this invention can be specifically defined as starches which are dually inhibited with a labile and a non-labile cross-linkage, which will have a Brookfield viscosity, measured at 72° F. of 40–5,000 cps. after being cooked at 5.0% solids, dry basis, in a pH 6.1 maleic acid buffer for 20 minutes at 212° F. The samples are brought back to 5.0% total solids with the pH 6.1 buffer and the Brookfield Viscosity of the 5.0% dispersion is measured at 72° F. after standing overnight at room temperature. The viscosity after retorting is determined as follows. After being cooked for 20 minutes at 212° F. in a pH 6.1 maleic acid buffer at a concentration of 5.0% solids, dry basis, the samples are brought back to 5.0% total solids with the pH 6.1 buffer and then sealed in eight ounce cans. The sealed cans are heated in a bath at 250° F. for fifteen minutes while being mechanically tumbled. The cans are then rapidly cooled with cold water, kept overnight at room temperature, and the viscosity measured at 72° F. with a Brookfield viscometer. The viscosity will have increased to 700–20,000 cps. The viscosity of the retorted product will always be greater than that of the product after cooking at 212° F. As is well known to one skilled in the art, the Brookfield viscosity of heavy starch dispersions will decrease if the spindle of the Brookfield viscometer is permitted to turn for a long time before recording the viscosity. The viscosity values described herein were obtained by allowing the spindle to turn three complete revolutions before reading and recording the viscosity.

The inhibited starch products of this invention are characterized by their ability upon cooking in aqueous medium to initially yield thin, low viscosity dispersions which can be subsequently thickened to high viscosity by means of the swelling of the starch granules as a result of the destruction of the labile cross-linkages. The labile cross-linkages of these starch products may be readily and controllably removed or disrupted by heat at temperatures above the boiling point of water, e.g. 220–300° F. Destruction of the labile cross-linkages can be controlled by pH, temperature, as well as the time period of exposure to heat. As can easily be understood, however, the time and temperature required for complete removal of labile cross-linkages will vary with the level of labile cross-linkages introduced into the inhibited starch. The level of labile cross-linkage of the inhibited starch is itself dependent upon such factors as the reagent, reagent concentration and reaction efficiency when the inhibited starches are prepared. The viscosity and texture of the starch cook after the labile cross-linkages have been removed will depend upon the base starch and the amount of non-labile inhibition.

The inhibited starch products of this invention are particularly useful in the food industry where they may be employed as thickeners for pie fillings, sauces, soups, baby foods etc. They are of particular interest in the canning industry as a result of their unique behavior during retorting of the canned food products.

In this application, the starch thickeners should not develop significant viscosity when cooked with foods at atmospheric pressure, but should develop significant viscosity under retort cooking conditions (240–300° F). When this type of starch thickener is used, the food product can be heated to retort temperatures much faster than normal because the initial low viscosity will result in much better heat transfer into the can. The reduced cooking time will lower operating costs and also improve the quality of the product. After the contents of the can are sterilized, the starch should thicken to give the final food product the desired viscosity and texture. The starch thickeners of this invention are very useful for this type of retort process. The cross-linkages of the inhibited starch products of this invention are initially intact and the starch dispersion is in a thin state, thereby enabling the heat utilized for sterilization of the food product to rapidly penetrate the can and its contents. The continued application of heat, however, serves to subsequently disrupt the labile cross-linkages of the inhibited starch thickeners thereby activating their delayed thickening properties to produce desirable high viscosity dispersions. A practical advantage of these inhibited starch products is derived from the fact that they are capable of having their labile cross-linkages disrupted at pH levels which range from about 2.0 to 8.0, the usual pH levels of canned foods. It has been found that upon retorting of these starches in various systems, low pH systems will tend to retard the rate of destroying the labile cross-linkages while higher pH systems will tend to accelerate this process. Some acid hydrolysis of the starch may also occur at low pH during retorting. Food systems at pH 4.5 or less are not normally retorted because *Clostridium botulinum* does not grow at these low pH's and heating above 180° F. is sufficient for sterilization. However, these low pH food systems are sometimes heated to retort temperatures (e.g. 270° F.) where the starch thickeners of this invention would be advantageous. For example, many spaghetti sauces have low pH's and would not normally be retorted, but a spaghetti sauce and meatball mixture must be retorted to sterilize the meatballs.

In summary, the novel starches of this invention are inhibited with two different types of cross-linkages. When used as a thickener, these starches give a very low viscosity to the food system at the beginning of retorting. If a starch derivative is used which produces a similar low initial viscosity before retorting, but contains only a non-labile cross-linkage, the final viscosity after retorting will be too thin and the resulting food product will not have the desired viscosity or texture. If a starch derivative is used which produces a similar low viscosity before retorting, but contains only a labile cross-linkage, the texture of the food product after retort will be undesirable if all of the cross-linkages are removed. For example, with waxy maize or tapioca starch, the product will be cohesive or stringy. If a starch product contains only labile cross-linkages and attempts are made to partially remove them leaving some residual labile cross-linkages to give a product having desirable viscosity and texture, there will be considerable difficulty in controlling the level of residual cross-linkages because variations in food systems, pH, retorting conditions, etc. will give variations in the amount of cross-linkages which are removed. The novel starches of this invention contain both labile and non-labile cross-linkages. The high level of inhibition gives a very thin product at the beginning of the retort process. This will result in rapid heat penetration into the can and its contents during retorting. The labile cross-linkages are substantially removed during the retort process and the starch swells to give a high final viscosity. The final viscosity is easily controlled by controlling the level of non-labile cross-linkages which remain substantially intact during the retort process. Because of the non-labile cross-linkages, the starch thickener will also give the final food product a desirable short and smooth texture. Thus, the unique starches of this invention have very desirable properties which were previously unobtainable by other methods.

In the following examples, which further illustrate the embodiments of this invention, all parts are given by weight unless otherwise specified.

EXAMPLE I

This example illustrates the preparation and viscosity characteristics of typical inhibited starch products of this invention before and after retorting.

The preparation of the starches, labeled A, B, C, D, E, and F used in the example, was as follows:

Starch A—The pH of a slurry of 600 parts potato starch in 900 parts water was adjusted to 8.0. The starch suspension was stirred at room temperature and 0.25 parts of cyanuric chloride was added. A pH of 8.0 was maintained by the addition of 3.0% sodium hydroxide at periodic intervals during the entire reaction. The reaction was complete after 2.7 hours, at which point there was no further change in pH. The pH was then lowered to 5.0 with 10% hydrochloric acid and the product recovered by filtration. The product was washed three times with water and dried.

Starch B—A total of 200 parts of Starch A was suspended in 300 parts water at room temperature and the pH adjusted to 8.0 with 3.0% sodium hydroxide. The starch suspension was stirred and 0.60 parts of bis(ethylcarbonic) adipic anhydride was added slowly over a 20 minute period. A pH of 8.0 was maintained by the addition of 3.0% sodium hydroxide at periodic intervals during the entire reaction. The reaction was complete after 2.5 hours at which point there was no further change in pH. The pH was lowered to 5.0 with dilute hydrochloric acid and the product recovered by filtration. The product was then washed three times with water and dried.

An analogous dually inhibited starch was prepared by reversing the reaction sequence used to prepare Starch B, i.e., reacting first with bis(ethylcarbonic) adipic anhydride and then with cyanuric chloride.

Starch C—A total of 1,000 parts of corn starch was suspended in a solution of 300 parts sodium sulfate and 15 parts sodium hydroxide in 1,250 parts water. After addition of 50 parts propylene oxide, the slurry was sealed in a jar and reacted at 40° C. for 24 hours while being continuously tumbled to keep the starch in suspension. The reaction was cooled to room temperature and the pH lowered to 6.0 with 10% hydrochloric acid. The product was recovered by filtration, washed three times with water, and dried.

A total of 200 parts of the thus prepared hydroxypropylated corn starch was added to a solution of 1.6 parts sodium hydroxide in 250 parts water. After the addition of 0.02 parts 1,4-dichlorobutene-2, the mixture was sealed in a jar and reacted at 40° C. for 16 hours while being continuously tumbled to keep the starch in suspension. The reaction was then cooled to room temperature and the pH was lowered to 6.0 with 10% hydrochloric acid. The product was washed three times with 50% aqueous ethanol and dried.

Starch D—A total of 100 parts Starch C was suspended in 150 parts water and the pH adjusted to 8.0 with 3.0% sodium hydroxide. The starch suspension was stirred and 2.0 parts linear polymeric adipic anhydride (prepared by the method of J. W. Hill, J. Am. Chem. Soc., 52, 4110 (1930)) added. The pH was maintained at 8.0 by the addition of 3.0% solution of sodium hydroxide at periodic intervals during the entire reaction. The reaction was complete after twenty-four hours, at which point there was no further change in pH. The pH was lowered to 5.5 with 10% hydrochloric acid and the starch recovered by filtration. The product was washed three times with 50% aqueous ethanol and dried.

Starch E—A total of 600 parts of tapioca starch was suspended in a solution of 4.8 g. sodium hydroxide in 900 parts water. The starch suspension was stirred and 0.12 parts phosphorus oxychloride added. The reaction was stirred at room temperature for one hour and the pH was then lowered to 5.0 with 10% hydrochloric acid. The product was recovered by filtration, washed three times with water, and dried.

Starch F—A total of 100 parts Starch E was suspended in 150 parts water and the pH adjusted to 8.0 with 3.0% sodium hydroxide. The starch suspension was stirred and 1.0 part (bis(ethylcarbonic)-fumaric anhydride was added slowly over a 15 minute period. A pH of 8.0 was maintained by the addition of 3.0% sodium hydroxide at periodic intervals during the entire reaction. The reaction was complete after 50 minutes at which point there was no further change in pH. The pH was lowered to 5.0 with 10% hydrochloric acid and the starch recovered by filtration. The starch was washed three times with water and dried.

A slurry of each of the inhibited starch derivatives in a pH 6.1 maleic acid buffer (see Table I for amounts of each) was placed in an eight ounce can. The filled cans were then heated in a boiling water bath for 20 minutes after which the cans were sealed and retorted in a bath maintained at 250° F. while being mechanically tumbled. The cans were removed after 15 minutes, rapidly cooled to room temperature, allowed to stand overnight, and the viscosities measured. The following table summarizes the viscosity data obtained on testing aqueous dispersions of each of the above described starches. The viscosities were measured with a Brookfield RVF viscometer using the indicated spindle at 10 r.p.m. at a temperature of 72° F.

TABLE I

| Sample | Parts starch | Parts buffer solution | Brookfield viscosity, cps. after— | | | |
|---|---|---|---|---|---|---|
| | | | 20 min. at 212° F. | Spindle No. | 15 min. at 250° F. | Spindle No. |
| Starch A | 13.0 | 234.0 | 12,740 | 5 | 16,060 | 5 |
| Starch B | 13.0 | 234.0 | 34 | 1 | 23,020 | 5 |
| Starch C | 15.0 | 180.0 | 10,000 | 5 | 31,800 | 5 |
| Starch D | 15.0 | 180.0 | 2,280 | 5 | 39,000 | 5 |
| Starch E | 13.0 | 195.0 | 22,000 | 5 | 34,050 | 6 |
| Starch F | 13.0 | 195.0 | 466 | 2 | 34,200 | 6 |

EXAMPLE II

This example illustrates the behavior of aqueous dispersions of a typical inhibited starch product of this invention with respect to variation in retort temperature and amount of labile ester cross-linkages.

A total of 1000 parts of waxy maize starch which had been previously inhibited with 0.04% epichlorohydrin according to Example I of U.S. Patent 2,500,950 was suspended in 1500 parts of water at room temperature and the pH adjusted to 8.0 with a 3% aqueous solution of sodium hydroxide. The starch suspension was stirred and 3.0 parts of bis(ethylcarbonic) adipic anhydride was added slowly over a 30 minute period. A pH of 8.0 was maintained by the addition of 3% sodium hydroxide at periodic intervals during the entire reaction. The reaction was complete after three hours at which point there was no further change in pH. The pH was then lowered to 6.5 with 6 N sulfuric acid and the product recovered by filtration. The product (starch G) was washed three times with water to remove salts and dried.

In a repetition of the above procedure, waxy maize was treated with 0.04% epichlorohydrin followed by 0.45% bis(ethylcarbonic) adipic anhydride (starch H).

A control sample comprised waxy maize starch inhibited only with 0.04% epichlorohydrin (starch I).

A series of dispersions of the inhibited starch products (18.0 parts of starch and 270 parts of pH 6.1 maleic acid buffer solution) were prepared and retorted at 250° F. as described in Example I. Viscosities (measured with a Brookfield RVF viscometer using #4 spindle at 10 r.p.m. at 72° F.) are tabulated in Table II.

TABLE II

| Sample | Retort temperature, ° F. | Brookfield viscosity, cps. after retorting for— | | | |
|---|---|---|---|---|---|
| | | 15 min. | 30 min. | 45 min. | 60 min. |
| Starch G | 250 | 10,520 | 13,600 | 16,80 | 17,280 |
| Do | 256 | 14,220 | 16,240 | 17,180 | 17,900 |
| Starch H | 250 | 6,240 | 9,900 | 13,000 | 13,980 |
| Do | 256 | 9,060 | 13,000 | 14,460 | 14,900 |
| Starch I | 250 | | | | 18,400 |

These data clearly show that the rate of viscosity increase, caused by the disruption of ester cross-linkages, is increased at higher retort temperatures and/or at lower labile ester cross-linkage treatments.

EXAMPLE III

This example illustrates the behavior of a number of aqueous dispersions of a typical inhibited starch product of this invention with respect to various pH levels.

A series of dispersions of the inhibited starch products of Example II was prepared in various buffer systems and adjusted with either hydrochloric acid or sodium hydroxide to the pH indicated in Table III, below.

TABLE III

| Adjusted pH | Buffer system |
| --- | --- |
| 4.3 | 13.2 parts glutaric acid in 1,000 parts distilled water. |
| 4.8 | 19.2 parts citric acid in 1,000 parts distilled water. |
| 5.1 | 13.4 parts malic acid in 1,000 parts distilled water. |
| 5.4 | 13.2 parts glutaric acid in 1,000 parts distilled water. |
| 6.1 | 11.6 parts maleic acid in 1,000 parts distilled water. |
| 7.0 | 1.19 parts sodium hydroxide and 6.8 parts potassium dihydrogen phosphate in 1,000 parts distilled water. |
| 8.0 | 1.87 parts sodium hydroxide and 6.8 parts potassium dihydrogen phosphate in 1,000 parts distilled water. |

These dispersions were retorted at 256° F., as described in Example I and the resulting viscosity data, measured as in Example I, is summarized in Table IV.

TABLE IV

| Sample | Retort pH | Brookfield viscosity, cps. after retorting for— | | | |
| --- | --- | --- | --- | --- | --- |
| | | 15 min. | 30 min. | 45 min. | 60 min |
| Starch G | 6.1 | 14,220 | 16,240 | 17,180 | 17,900 |
| Do | 5.4 | 3,560 | 9,000 | 12,400 | 14,480 |
| Do | 5.1 | 2,760 | 6,360 | 8,400 | 9,800 |
| Do | 4.8 | 2,580 | 6,200 | 7,400 | 8,700 |
| Do | 4.1 | 1,860 | 2,460 | 4,400 | 5,500 |
| Starch H | 6.3 | 9,060 | | | |
| Do | 7.0 | 12,800 | | | |
| Do | 8.0 | 15,260 | | | |

These data clearly show that rate of destruction of the labile ester cross-linkages, which causes a viscosity increase, is decreased as pH is lowered below 6.1, but is accelerated as pH is raised above 6.1.

EXAMPLE IV

This example illustrates the preparation of a chicken gravy containing a typical inhibited starch of the present invention and the viscosity characteristics thereof.

In a series of experiments, 60.6 parts of chicken broth (fat removed), 3.2 parts of chicken fat, 30.2 parts of water and 6.0 parts of an inhibited starch product, as described fully below, were combined and cooked at 190° F. for a period of 30 minutes. Water lost by evaporation was replaced in order to keep a constant weight. Each mixture contained 6.0 parts of an inhibited starch product which had been prepared using varying amounts of epichlorohydrin and bis(ethylcarbonic) adipic anhydride according to the procedure described in Example II. Thus, the description of the starches, labeled L, M, and N, used in the various gravy mixtures, was as follows:

Starch L—0.04% epichlorohydrin-inhibited waxy maize base reacted with 0.30% bis(ethylcarbonic) adipic anhydride.

Starch M — 0.04% epichlorohydrin-inhibited waxy maize base reacted with 0.45% bis(ethylcarbonic) adipic anhydride.

Starch N—0.06% epichlorohydrin inhibited waxy maize base reacted with 0.60% of bis(ethylcarbonic) adipic anhydride.

A Cenco-Bostwick Consistometer was used to measure the viscosity. Bostwick viscosity is measured in terms of the distance a sample flows on an inclined plane. The greater the distance traveled, the lower the viscosity.

Each of the gravy mixtures was very thin after the initial cook at 190° F. and had a Bostwick viscosity of more than 24 cm. The pH level of the food system was approximately 6.0. Each of the gravy mixtures, respectively, thereafter was poured into conventional #2 cans, which were then sealed in the usual manner. The filled cans were retorted at 245° F. for a period ranging from ¾ hour to 3 hours, as indicated in the table below and the Bostwick viscosity of each dispersion was measured immediately after retorting and after cooling the retorted sample to 72° F. Table V summarizes the data obtained.

TABLE V

| Sample description | Retort period, hours | Bostwick viscosity after retorting (distance flowed in 60 sec.) measured at about— | |
| --- | --- | --- | --- |
| | | 200° F. | 72° F. |
| Gravy A, contains Starch L | 0.75 | 5.75 cm | 4.50 cm. |
| | 1.5 | 5.75 cm | 4.50 cm. |
| | 3.0 | 6.00 cm | 4.75 cm. |
| Gravy B, contains Starch M | 0.75 | 9.00 cm | 6.00 cm. |
| | 1.5 | 5.75 cm | 4.75 cm. |
| | 3.0 | 6.00 cm | 4.74 cm. |
| Gravy C, contains Starch N | 0.75 | 22.00 cm | 22.25 cm. |
| | 1.5 | 12.00 cm | 10.75 cm. |
| | 3.0 | 6.25 cm | 7.00 cm. |

The above data clearly illustrate the sharp increase in viscosity of each of the gravy samples obtained after retorting as a result of the inhibited starch product of this invention used therein. The data likewise illustrate the correlation in degree of inhibition of the inhibited starch products as a consequence of introducing varying amounts of labile and non-labile cross-linkages.

Starch L and Starch M contain the identical amount of non-labile cross-linkages, but Starch M contains a greater amount of labile cross-linkages than Starch L. It therefore requires a longer retort period to remove the labile cross-linkages from Starch M (see Gravy B) than from Starch L (see Gravy A). After all of the labile cross-linkages have been removed, the final viscosity of Gravy A and Gravy B is identical because the component starches both contain the identical amount of non-labile cross-linkages. Starch N contains a greater amount of non-labile, as well as labile cross-linkages than Starch L or Starch M. It thus requires a longer retort time to remove the labile cross-linkages from Starch N (see Gravy C) and the final viscosity of Gravy C is lower than that of Gravy A or B because Starch N contains a greater amount of non-labile cross-linkages than Starch L or Starch M.

EXAMPLE V

This example illustrates the use of an inhibited starch product in preparing a canned pie filling having an acidic pH level.

A total of 34.5 parts of cherry juice, 6.0 parts of water, 2.8 parts of an inhibited starch product as described fully below, 0.5 parts of lemon juice, 8 parts of sugar, and 0.2 parts of sodium chloride were combined and heated to 120° F. for a period of 20 minutes. The warm mixture was poured into a can containing 48.0 parts of cherries (previously thawed and drained) and the can was sealed under reduced pressure in the usual manner. The pH level of the complete food system was approximately 2.3. The sealed can was thereafter retorted at 208–255° F. for a period of 12 minutes and then cooled in a cold water bath. The pH at end of retort was 3.0.

The inhibited starch product had been prepared by reacting waxy maize with 0.04% epichlorohydrin followed by 0.40% bis(ethylcarbonic) adipic anhydride.

The pie filling exhibited a substantial viscosity increase after retorting.

EXAMPLE VI

This example illustrates the use of polyadipic anhydride to prepare the products of this invention.

The preparation of the starches, labeled O, P, Q, R, and S used in the example, was as follows:

Starch O—A total of 500 parts waxy maize starch which had been previously inhibited with 0.04% epichlorohydrin according to Example I of U.S. Pat. 2,500,950 was suspended in 750 parts water at room temperature and the pH adjusted to 8.0 with a 3.0% aqueous solution of sodium hydroxide. The starch solution was stirred and 5.0 parts polyadipic anhydride was added rapidly. The polyadipic anhydride was prepared by the method of J. W. Hill, J. Am. Chem. Soc., 52, 4110 (1930). A pH of 8.0 was maintained by the addition of 3.0% aqueous sodium hydroxide at periodic intervals during the entire reaction. The reaction was stopped after twenty-four hours by lowering the pH to 5.0 with dilute hydrochloric acid, filtering, and washing three times with water.

Starch P—The procedure used to prepare Starch O was repeated, except the amount of polyadipic anhydride was increased to 7.5 parts.

Starch Q—The procedure used to prepare Starch O was repeated, except the amount of polyadipic anhydride was increased to 10.0 parts.

Starch R—The procedure used to prepare Starch O was repeated, except the amount of epichlorohydrin was increased to 0.05% and the amount of polyadipic anhydride increased to 12.5 parts.

Starch S—Waxy maize starch which was inhibited with 0.04% epichlorohydrin according to Example I of U.S. Pat. 2,500,950.

Each of these starches was cooked at 5.0% solids, dry basis, in a pH 6.1 maleic acid buffer at 212° F. for 20 minutes. The samples were brought back to 5.0% solids with the pH 6.1 buffer, kept overnight at room temperature, and then the Brookfield viscosity measured at 72° F. The data is tabulated in Table VI.

After cooking for 20 minutes and bringing the samples back to 5.0% solids as described above, the resulting dispersion was sealed in eight ounce cans. The sealed cans were retorted at 250° F. for fifteen minutes while being mechanically tumbled. The cans were rapidly cooled with cold water, kept overnight at room temperature, and the viscosity measured at 72° F. with a Brookfield viscometer. The obtained values are shown in Table VI. These data clearly show a significant increase in viscosity during retort which is caused by the removal of the labile crosslinkages. The initial viscosity of Starch S is much higher than that of the dually inhibited Starches O, P, Q, R, and the high initial viscosity will interfere with heat penetration into the contents of the can.

TABLE VI

| Sample | Brookfield viscosity, cps.* after— | |
|---|---|---|
| | 20 minutes at 212° F. | 15 minutes at 250° F. |
| Starch O | 3,810 | 6,535 |
| Starch P | 3,070 | 7,360 |
| Starch Q | 1,450 | 5,665 |
| Starch R | 2 50 | 725 |
| Starch S | 6,820 | 7,790 |

1 RVF Brookfield viscometer using #4 spindle at 20 r.p.m.
2 RVF Brookfield viscometer using #4 spindle at 100 r.p.m.

EXAMPLE VII

This example illustrates the use of an inhibited starch product of this invention at different percent solid levels.

A series of suspensions of the dually inhibited starch product (Starch O of Example VI) was prepared in water at different percent solid levels and cooked at 180° F. for 30 minutes. The resulting dispersions were then retorted at 240° F. for periods ranging from 15 minutes to one hour as indicated in Table VII, and the Bostwick viscosity measured immediately after retorting. The waxy maize starch inhibited only with 0.04% epichlorohydrin (Starch S) was retorted for control purposes. The data clearly show a significant increase in viscosity during retort which is caused by the removal of the labile crosslinkage. The data also shows that the viscosity increases as the percent solids increases.

The viscosities of dispersions, cooked at 212° F. for 20 minutes in a pH 6.1 maleic acid buffer, brought back to original percent solids with pH 6.1 buffer, and then cooled overnight, were measured at 72° F. with a Brookfield RVF viscometer (Spindle 4, speed 20). The results are tabulated in Table VII and show the increase in viscosity as the percent solids of starch is increased.

TABLE VII

| Sample | Percent starch dispersion | Brookfield viscosity, cps. after 20 min. at 212° F. | Bostwick viscosity [1] | | | | |
|---|---|---|---|---|---|---|---|
| | | | Cook at 180° F. | Retorted at 240° F. for— | | | |
| | | | | 15 min. | 30 min. | 45 min. | 60 min. |
| Starch O | 4.0 | 745 | 24+ | 24+ | 17 | 13.75 | 11.25 |
| Do | 4.5 | 2,100 | 24+ | 13.75 | 12 | 10 | 8.25 |
| Do | 5.0 | 3,810 | 17.5 | 10.5 | 8.5 | 7.75 | 6.0 |
| Starch S | 5.0 | 6,820 | 7.0 | 5.5 | 5.5 | 5.5 | 4.75 |

[1] Distance flowed in 60 seconds.

EXAMPLE VIII

This example illustrates the preparation of a conventional, creamed mushroom soup having therein a starch thickener typical of the type embodied in this invention.

The starch thickener was prepared according to the procedure described in Example VI wherein waxy maize starch was first treated with 0.04% epichlorohydrin and then 2.775% polyadipic anhydride.

A portion of the above starch was then admixed with various ingredients usually employed in the preparation of a conventional, creamed mushroom soup. The composition of the test soup comprised the following:

Ingredient: Concentration in Parts

Part A:
  Milk _____ 35.0
  Heavy cream _____ 8.0
  Sugar _____ 0.94
  Water _____ 20.691
Part B:
  Dually inhibited starch (anhydrous) __ 5.0
  Water* _____ 15.5
  Mushrooms _____ 10.0
  Corn oil _____ 3.0
  Salt (sodium chloride) _____ 1.80
  Monosodium glutamate _____ 0.03
  Curry powder _____ 0.009
  White pepper _____ 0.03

100.000

*Total of water adsorbed by starch and free water.

Part A of the above described cream of mushroom soup was heated to 190° F. and Part B which was previously thoroughly mixed was then added. The soup was cooked at 185–190° F. for about 20 minutes with stirring at which point an initial Bostwick viscosity of greater than 24 cm. (distance flowed in 60 seconds) was measured. The hot mixture was then placed in an autoclave and heated to 258° F. at 19 p.s.i.g. It required about 20 minutes for the autoclave temperature to reach 258° F. and the soup was retorted at 258° F. for an additional 30 minutes. The Bostwick viscosity immediately after retort (measured at 180° F.) was 1.0. After being stored at room temperature for 24 hours, the Bostwick viscosity (measured at 72° F.) was 0.4 cm.

This data clearly shows that the starch thickeners of this invention remain thin when cooked at 190° F., but develop significant viscosity during retorting.

In summary, this invention provides novel inhibited starch derivatives having both labile and non-labile crosslinkages useful in applications requiring starches with accurately controlled inhibition characteristics.

According to the present invention, a starch base is usually first reacted with a reagent which will produce relatively non-labile cross-linkages followed by reaction with a reagent which will produce a labile cross-linkage. The resulting dually inhibited starch products are characterized by their usefulness in preparing food products having a thin consistency before retorting and a desirable thick consistency after retorting. The inhibited starch products produced by the process of the invention are characterized by their ability, upon cooking in aqueous medium, to initially yield thin low viscosity dispersions which can be subsequently thickened to high viscosity by means of the swelling of the starch granules as a result of the destruction of the labile cross-linkages. The labile cross-linkages of these starch products may be readily and controllably removed or disrupted by heat at temperatures above the boiling point of water, e.g., 220–300° F. In the starches produced, both types of cross-linkages remain substantially intact when the starch is cooked in water at a pH of 6.1 and a temperature of 212° F. for 20 minutes, and only one of said types of cross-linkages, namely, the non-labile type, remains substantially intact when said starch is cooked in water at a pH of 6.1 and a temperature of 250° F. for 15 minutes.

It is usually necessary in practicing the process, to react the starch base successively with a first cross-linking agent which produces the relatively stable (non-labile) cross-linkages and then with the second cross-linking agent (namely, the labile cross-linking agent) which produces relatively easily disruptable linkages. Should it be attempted to introduce the relatively labile cross-linkages first, the process would usually be ineffective because the reaction conditions required for introducing most relatively non-labile cross-linkages, namely the high pH of the reaction medium, would cause the relatively labile cross-linkages to be disrupted.

If the non-labile cross-linkage can be introduced under conditions where the labile cross-linkage is stable, the order of reaction is then not important and either cross-linkage can be introduced first followed by the other one. For instance, in Example I both cyanuric chloride and bis(ethylcarbonic) adipic anhydride are reacted with starch at controlled pH 8.0 and room temperature to produce a dually inhibited starch product of this invention.

Variations may be made in materials, proportions, and procedures without departing from the scope of this invention.

What is claimed is:

1. A dually inhibited starch having labile and non-labile cross-linkages wherein both the labile and non-labile cross-linkages remain substantially intact when said starch is cooked in pH 6.1 buffer at a temperature of 212° F. for 20 minutes and only the non-labile cross-linkages remain substantially intact when said starch is retorted in pH 6.1 buffer at a temperature of 250° F. for 15 minutes; and the viscosity of the retorted starch is higher than the viscosity of the cooked starch.

2. A dually inhibited starch according to Claim 1 wherein said non-labile cross-linkages are comprised of residues of cross-linking agents selected from the group consisting of epichlorohydrin, phosphorus oxychloride, divinyl sulfone, 1,4-dichlorobutene-2, cyanuric chloride, and sodium trimetaphosphate and said labile cross-linkages are comprised of residues of cross-linking agents selected from the group consisting of bis(ethylcarbonic) adipic anhydride, linear polymeric adipic anhydride, bis(ethylcarbonic)fumaric anhydride, succinyl guanidine, adipyl guanidine, phosgene, 1,1'-carbonyldiimidazole, chlorine and glycine, the diimidazolide of adipic acid, the diimidazolide of succinic acid, mixtures of adipic acid with acetic anhydride and divinyl adipate.

3. A process for preparing dually inhibited starches comprising the steps of reacting a starch base successively and in either order with a first cross-linking agent which produces non-labile cross-linkages and a second cross-linking agent which produces labile cross-linkages providing that the cross-linkages introduced first are stable under the reaction conditions required for the reaction with the second cross-linking agent.

4. A process according to Claim 3 wherein said first cross-linking agent produces non-labile cross-linkages which remain substantially intact when said starch is retorted at pH 6.1 and a temperature of 250° F. for 15 minutes, and said second cross-linking agent produces labile cross-linkages which remain substantially intact when said starch is cooked at pH 6.1 and a temperature of 212° F. for 20 minutes but are substantially disrupted when said starch is retorted at pH 6.1 and a temperature of 250° F. for 15 minutes.

5. A process according to Claim 3 wherein said first cross-linking agent is selected from the group consisting of epichlorohydrin, phosphorus oxychloride, divinyl sulfone, 1,4-dichlorobutene-2, cyanuric chloride, and sodium trimetaphosphate and said second cross-linking agent is selected from the group consisting of bis(ethylcarbonic) adipic anhydride, linear polymeric adipic anhydride, bis(ethylcarbonic)fumaric anhydride, succinyl guanidine, adipyl guanidine, phosgene, 1,1'-carbonyl-diimidazole, chlorine and glycine, the diimidazolide of adipic acid, the diimidazolide of succinic acid, mixtures of adipic acid with acetic anhydride and divinyl adipate.

6. A dually inhibited starch according to Claim 1 wherein the labile cross-linkage is a diester cross-linkage.

7. A dually inhibited starch according to Claim 1 wherein the labile cross-linkage is a diester cross-linkage and the non-labile cross-linkage is a diether cross-linkage.

8. A dually inhibited starch according to Claim 1 wherein the labile cross-linkage is a diester cross-linkage and the non-labile cross-linkage is a phosphate ester cross-linkage.

9. A dually inhibited starch according to Claim 1 characterized in that an aqueous dispersion of said starch has a Brookfield viscosity, measured at 72° F. and 5.0% solids, between 40 and 5,000 centipoises after being cooked at 5.0% solids, dry basis, in a pH 6.1 maleic acid buffer for 20 minutes at 212° F. and a Brookfield viscosity, measured at 72° F. and 5.0% solids, between 700 and 20,000 centipoises after being retorted at 5.0% solids, dry basis, in a pH 6.1 maleic acid buffer for 15 minutes at 250° F., the viscosity of the dispersion being greater after retorting at 250° F. than after cooking at 212° F.

References Cited

UNITED STATES PATENTS 3,699,095   10/1972   Tessler et al. _____ 260—233.5

MELVYN I. MARQUIS, Primary Examiner

U.S. Cl. X.R.

260—233.3 R; 426—215, 380